United States Patent [19]

Lee et al.

[11] Patent Number: 5,546,369
[45] Date of Patent: Aug. 13, 1996

[54] OPTICAL DISK SYSTEM FOR RECORDING AND REPRODUCING A MINI DISK AND STANDARD COMPACT DISCS

[75] Inventors: Hyung-hee Lee, Kyungki-do; Jung-kwon Heo, Kyungsangnam-do, both of Rep. of Korea

[73] Assignee: Samsung Electronics Co., Ltd., Kyungki-do, Rep. of Korea

[21] Appl. No.: 413,887

[22] Filed: Mar. 30, 1995

[30] Foreign Application Priority Data

Mar. 31, 1994 [KR] Rep. of Korea ................. 94-6805

[51] Int. Cl.⁶ .................................................. G11B 7/00
[52] U.S. Cl. .................. 369/58; 369/124; 369/34; 369/54
[58] Field of Search ................. 369/58, 47, 54, 369/124, 32, 60, 30, 34, 35

[56] References Cited

U.S. PATENT DOCUMENTS

| 5,412,628 | 5/1995 | Yamazaki et al. | 369/54 |
| 5,485,447 | 1/1996 | Minoda | 369/47 |

*Primary Examiner*—Nabil Z. Hindi
*Attorney, Agent, or Firm*—Leydig, Voit & Mayer

[57] ABSTRACT

In an optical disk recording and reproducing apparatus, audio data compressed in MD format can be recorded on a CD-sized optical disk and can be reproduced from both mini disks and compact disks. A disk for reproducing, in which audio data compressed in MD format is recorded by forming pits on a CD-sized polycarbonate substrate, enjoys a long play back time.

2 Claims, 1 Drawing Sheet

5,546,369

OPTICAL DISK SYSTEM FOR RECORDING AND REPRODUCING A MINI DISK AND STANDARD COMPACT DISCS

BACKGROUND OF THE INVENTION

The present invention relates to an optical disk recording and reproducing apparatus, and more particularly, to an optical disk recording and reproducing apparatus, by which both a compact disk and mini disk can be reproduced.

Recently introduced mini disk (MD) can record and reproduce compressed audio data using a disk whose size is one quarter that of a compact disk (CD) with a quality tone level nearly equal to that from a compact disk. Accordingly mini disk is attracting public attention as a next-generation audio device which can replace the compact disk. As with the case of a compact disk which is reproduced by a compact disk player, the mini disk is reproduced by a specially manufactured mini disk player. That is, a conventional mini disk player reproduces only mini disks and the compact disk player reproduces only compact disks. Therefore, in order to reproduce both types of disks, separate players are needed.

SUMMARY OF THE INVENTION

To solve the above problem, it is an object of the present invention to provide an optical disk recording and reproducing apparatus, by which both mini disks and compact disks can be reproduced as one modified from the conventional mini disk player and audio data which is compressed up to MD format can be recorded for up to four times the duration of the conventional MD on a CD-sized optical disk.

To achieve the above object of the present invention, there is provided an optical disk recording and reproducing apparatus according to the present invention comprising: an analog-to digital (A/D) converter for converting an input audio signal into a digital signal, in a recording mode; an audio compressor/decompressor for compressing the audio data output from the A/D converter into MD format, in the recording mode, and for decompressing deinterleaved audio data into MD format, in a reproducing mode; a memory for storing audio data output from the audio compressor/decompressor, in the recording mode, and for storing the deinterleaved audio data, in the reproducing mode; a memory controller for controlling the data quantity to be stored in the memory; an interleaver/deinterleaver for interleaving the audio data stored in the memory, in the recording mode, and for deinterleaving decoded audio data, in the reproducing mode; an encoder/decoder for encoding the audio data output from the interleaver/interleaver, in the recording mode, and for decoding the audio data reproduced from a recording medium, using a predetermined modulation/demodulation method; a recording portion for recording the audio data compressed into MD format, output from the encoder/decoder after being encoded, on a recording medium in the form of a compact disk size or a magneto-optical disk of a mini disk size; a reproducing portion for reproducing the audio data recorded on an MD-formatted or a CD-formatted recording medium; an interpolator/muter for interpolating or muting error-uncorrected audio data according to the error size included in the audio data output from the encoder/decoder, in the reproducing mode; a system controller for controlling so as to output the audio data output from the encoder/decoder to the interleaver/deinterleaver when the recording medium is for the MD format and to the interpolator/muter when the recording medium is for the CD format, in the reproducing mode; a multiplexer for selectively outputting the audio data output from the audio compressor/decompressor and the audio data output from the interpolator/muter, under the control of the system controller, in the reproducing mode; and a digital-to-analog (D/A) converter for converting the audio data output from the multiplexer into an analog audio signal, in the reproducing mode.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
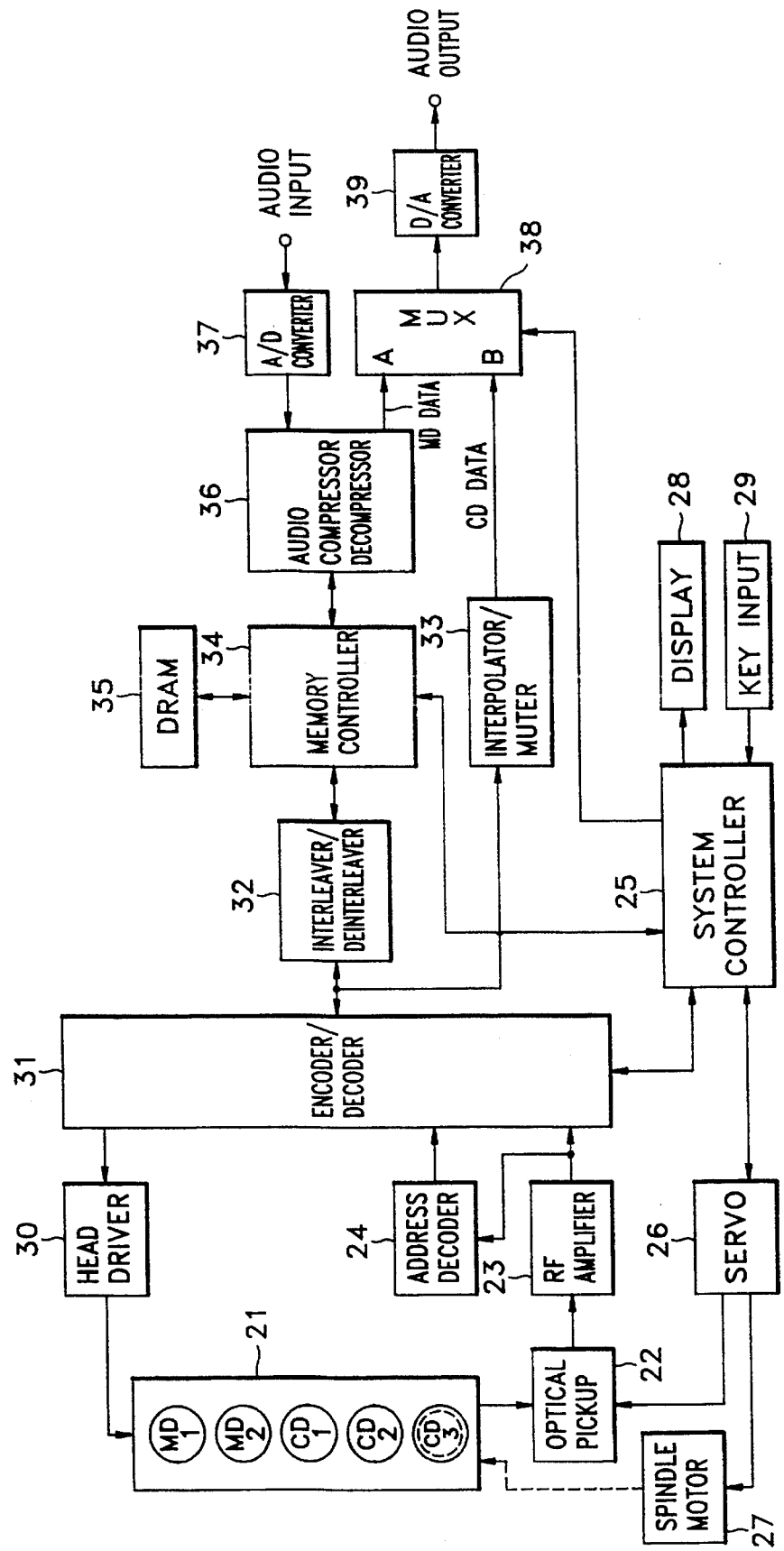
FIG. 1 is a block diagram showing an optical disk recording and reproducing apparatus according to a preferred embodiment of the present invention.

The construction of the block diagram shown in FIG. 1 is composed of an analog-to-digital (A/D) converter 37 for converting an input audio signal into a digital signal, in a recording mode; an audio compressor/decompressor 36 for compressing the audio data output from A/D converter 37 into MD format, in the recording mode, and for decompressing deinterleaved audio data into MD format, in a reproducing mode; a memory 35, for example, a DRAM, for storing audio data output from audio compressor/decompressor 36, in the recording mode, and for storing the deinterleaved audio data, in the reproducing mode; a memory controller 34 for controlling the data quantity to be stored in memory 35; an interleaver/deinterleaver 32 for interleaving the audio data stored in memory 35, in the recording mode, and for deinterleaving decoded audio data, in the reproducing mode; an encoder/decoder 31 for encoding the audio data output from interleaver/interleaver 32, in the recording mode, and for decoding the audio data reproduced from recording medium, using a predetermined modulation/demodulation method; a recording portion having an optical head (not shown), head driver 30, spindle motor 27 and servo 26 for recording the audio data compressed in MD format, output from encoder/decoder 31 after being encoded, on an optical-magnetic disk of a compact disk size or an optical-magnetic disk of a mini disk size; a reproducing portion having an optical pickup 22, RF amplifier 23, address decoder 24, spindle motor 27, servo 26 for reproducing the audio data recorded on an MD-formatted or CD-formatted recording medium 21; an interpolator/muter 33 for interpolating or muting error-uncorrected audio data according to the error size included in the audio data output from encoder/decoder 31, in the reproducing mode; a system controller 25 for controlling so as to output the audio data output from encoder/decoder 31 to interleaver/deinterleaver 32 when recording medium 21 is for the MD format and to interpolator/muter 33 when recording medium 21 is for the CD format, in the reproducing mode; a multiplexer 38 for selectively outputting the audio data output from audio compressor/decompressor 36 and the audio data output from interpolator/muter 33, under the control of system controller 25, in the reproducing mode; and a digital-to-analog (D/A) converter 39 for converting the audio data output from multiplexer (MUX) 38 into an analog audio signal, in the reproducing mode. In addition, the optical disk recording and reproducing apparatus includes a display 28 for displaying information of system controller 25 and a key input portion 29 for inputting commands to system controller 25.

The operation of the optical disk recording and reproducing apparatus shown in FIG. 1 will be described.

In recording medium 21, disk MD1 represents a mini disk for reproducing, disk MD2 represents a mini disk for recording and reproducing, disk CD1 represents a general compact disk, disk CD2 represents a compact disk in which the audio data compressed in MD format is recorded, and disk CD3 represents a magneto-optical disk for recording and reproducing the audio data compressed in MD format. Here, disks MD1 and CD2 are for reproducing, where the audio data is recorded on a polycarbonate substrate such as a pit. The difference between disks MD1 and CD2 is that the recording capacity of the later is about four times that of the former since the size of disk CD2 is equal to that of a general compact disk.

The flow of signal in the case where disk MD1 or CD2 of recording medium 21 is reproduced is as follows.

First, the audio signal recorded on the disk MD1 or CD2 is picked up by optical pickup 22 and applied to encoder/decoder 31 via a radio frequency (RF) amplifier 23. Encoder/decoder 31 performs a decoding operation, by eight-to-fourteen demodulating the audio signal output from RF amplifier 23 and correcting the error of the EFM-demodulated signal by a cross-interleaved Reed-Solomon code (CIRC). After the data whose error is corrected from encoder/decoder 31 is deinterleaved in deinterleaver/deinterleaver 32, the interleaved data is stored in memory 35, under the control of memory controller 34. Here, memory controller 34 is for controlling the data quantity stored in memory 35. The data stored in memory 35 is decompressed by audio compressor/decompressor 36 and MD data output from audio compressor/decompressor 36 is applied to multiplexer (MUX) 38. Here, audio compressor/decompressor 36 uses an adaptive transform acoustic decoding (ATCD) method. Multiplexer 38 selectively outputs the MD data output from audio compressor/decompressor 36 and the CD data output from interpolator/muter 33, under the control of system controller 25. The audio signal output from multiplexer 38 is converted into an analog signal in D/A converter 39 and is output as the final MD data. The above-described reproducing process is the same as that of the conventional mini disk player.

That is, when an MD-formatted recording medium (disk MD1 or CD2) among recording medium 21 is reproduced, system controller 25 controls the data output from encoder/decoder 31 to pass interleaver/deinterleaver 32, memory controller 34, memory 35, audio compressor/decompressor 36, multiplexer 38 and D/A converter 39, since the MD-formatted data is compressed.

Meanwhile, the signal flow in the case where disk CD1 as the general compact disk of recording medium 21 is reproduced is as follows.

First, the audio signal recorded on the disk CD1 is picked up by optical pickup 22 and applied to encoder/decoder 31 via RF amplifier 23. Encoder/decoder 31 performs a decoding operation, by demodulating the audio signal output from RF amplifier 23 and correcting the error of the EFM-demodulated signal, in the same manner as that during the reproducing of disk MD1 or CD2. The CD data whose error is corrected from encoder/decoder 31 is applied to interpolator/muter 33 and interpolator/muter 33 interpolates or mutes error-uncorrected audio data according to the error size included in the audio data output from encoder/decoder 31. That is, when the error size is less than a predetermined value, the error-uncorrected audio data is interpolated, by using the preceding and following data of the error-uncorrected audio data, and otherwise the error-uncorrected audio data is muted. The audio data interpolated or muted from interpolator/muter 33 is applied to multiplexer (MUX) 38. Multiplexer 38 selectively outputs the MD data output from audio compressor/decompressor 36 or the CD data output from interpolator/muter 33, under the control of system controller 25. The audio signal output from multiplexer 38 is converted into an analog signal in D/A converter 39 and is output as the final CD data.

That is, when a CD-formatted recording medium (disk CD1) among recording medium 21 is reproduced, system controller 25 controls the data output from encoder/decoder 31 to pass interpolator/muter 33, multiplexer 38 and D/A converter 39, since the CD-formatted data is not compressed.

Meanwhile, the signal flow during recording and reproducing of MD2 or CD3 among recording medium 21 is as follows.

As the common features of disk MD2 and CD3, both are magneto-optical disks and can record the data according to a magnetic modulation overwrite method. On the other hand, MD2 and CD3 are different from each other in terms of capacity. That is, the recording capacity of disk CD3 is about four times that of disk MD2 since the size of disk MD2 is equal to that of the conventional mini disk and that of disk CD3 is equal to that of the conventional compact disk.

First, when audio data is recorded on disk MD2 or CD3, the audio data converted into a digital signal in A/D converter 37 after being sampled at a sampling rate of 44.1 Hz is compressed to about one fifth its original quantity in audio compressor/decompressor 36. The compressed audio data is then interleaved in interleaver/deinterleaver 32 and applied to encoder/decoder 31. Thereafter, the audio data is encoded by an advanced CIRC (ACIRC) method and a parity for error-correcting is added thereto, to thereby become EFM-modulated audio data. The EFM-modulated audio data is recorded on disk MD2 or CD3 recording medium among recording medium 21, by means of the magnetic modulation overwrite method. The above-described recording process is the same as that when the audio data is recording on a mini disk for recording in the conventional mini disk player.

Meanwhile, when disk MD2 or CD3 is reproduced, the audio signal recorded on MD2 or CD3 is picked up by optical pickup 22 and applied to encoder/decoder 31 via RF amplifier 23. Encoder/decoder 31 performs a decoding operation, by EFM-modulating the output signal of RF amplifier 23 and correcting the error of the demodulated signal. The data error-corrected from encoder/decoder 31 is stored in memory 35 after being deinterleaved in interleaver/deinterleaver 32, under the control of system controller 25. The data stored in memory 35 is output via audio compressor/decompressor 36, multiplexer 38 and D/A converter 39. The above-described reproducing process is the same as that of disks MD1 and CD2.

As described above, in the optical disk recording and reproducing apparatus according to the present invention, the audio data compressed in MD format can be recorded on a CD-sized magneto-optical disk for a duration four times that of the conventional mini disk, and both MD- and CD-type disks can be reproduced. Since such a combination-type system can be made much smaller than a separate two component system, the optical disk recording and reproducing apparatus according to the present invention is conducive for a car audio system.

Also, a disk for reproducing, in which MD-format-compressed audio data is recorded by forming pits on a polycarbonate substrate of the CD size, enjoys a long playback time.

What is claimed is:

1. An optical disk recording and reproducing apparatus comprising:

an analog-to digital (A/D) converter for converting an input audio signal into a digital signal, in a recording mode;

an audio compressor/decompressor for compressing the audio data output from said A/D converter into MD format, in the recording mode, and for decompressing deinterleaved audio data into MD format, in a reproducing mode;

a memory for storing audio data output from said audio compressor/decompressor, in the recording mode, and for storing the deinterleaved audio data, in the reproducing mode;

a memory controller for controlling the data quantity to be stored in said memory;

an interleaver/deinterleaver for interleaving the audio data stored in said memory, in the recording mode, and for deinterleaving decoded audio data, in the reproducing mode;

an encoder/decoder for encoding the audio data output from said interleaver/deinterleaver, in the recording mode, and for decoding the audio data reproduced from a recording medium, using a predetermined modulation/demodulation method;

a recording portion for recording the audio data compressed as the MD format, output from said encoder/decoder after being encoded, on a recording medium in the form of a compact disk size or a magneto-optical disk of a mini disk size;

a reproducing portion for reproducing the audio data recorded on an MD-formatted or a CD-formatted recording medium;

an interpolator/muter for interpolating or muting error-uncorrected audio data according to the error size included in the audio data output from said encoder/decoder, in the reproducing mode;

a system controller for controlling so as to output the audio data output from said encoder/decoder to said interleaver/deinterleaver when the recording medium is for the MD format and to said interpolator/muter when the recording medium is for the CD format, in the reproducing mode;

a multiplexer for selectively outputting the audio data output from said audio compressor/decompressor and the audio data output from said interpolator/muter, under the control of said system controller, in the reproducing mode; and a digital-to-analog (D/A) converter for converting the audio data output from said multiplexer into an analog audio signal, in the reproducing mode.

2. An optical disk recording and reproducing apparatus as claimed in claim 1, wherein said recording medium is one selected from the group consisting of a mini disk for reproducing, a mini disk for recording and reproducing, a general compact disk, a compact disk in which audio data compressed in MD format is recorded, and a magneto-optical disk in which audio data compressed in MD format can be recorded and reproduced.

* * * * *

UNITED STATES PATENT AND TRADEMARK OFFICE
CERTIFICATE OF CORRECTION

PATENT NO. : 5,546,369

DATED : August 13, 1996

INVENTOR(S) : Lee et al.

It is certified that error appears in the above-indentified patent and that said Letters Patent is hereby corrected as shown below:

Column 5; Line 31, change "into MD" to --in MD--.

Signed and Sealed this

Eighteenth Day of February, 1997

Attest:

BRUCE LEHMAN

*Attesting Officer*  *Commissioner of Patents and Trademarks*